US012572780B2

(12) United States Patent
Xu et al.

(10) Patent No.: US 12,572,780 B2
(45) Date of Patent: Mar. 10, 2026

(54) SYSTEM AND METHOD FOR CROSS-MODAL INTERACTION BASED ON PRE-TRAINED MODEL

(71) Applicant: Huawei Technologies Co., Ltd., Shenzhen (CN)

(72) Inventors: Hang Xu, Hong Kong (CN); Lu Hou, Shenzhen (CN); Guansong Lu, Shanghai (CN); Minzhe Niu, Shanghai (CN); Zhenguo Li, Hong Kong (CN); Runhui Huang, Shenzhen (CN); Lewei Yao, Hong Kong (CN); Chunjing Xu, Shenzhen (CN); Xiaodan Liang, Guangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 740 days.

(21) Appl. No.: 17/900,592

(22) Filed: Aug. 31, 2022

(65) Prior Publication Data

US 2024/0070436 A1     Feb. 29, 2024

(51) Int. Cl.
| | |
|---|---|
| *G06F 16/30* | (2019.01) |
| *G06F 40/284* | (2020.01) |
| *G06N 3/045* | (2023.01) |

(52) U.S. Cl.
CPC .......... *G06N 3/045* (2023.01); *G06F 40/284* (2020.01)

(58) Field of Classification Search
CPC .............................. G06N 3/045; G06F 40/284
See application file for complete search history.

(56) References Cited

U.S. PATENT DOCUMENTS

| | | | |
|---|---|---|---|
| 10,410,351 B2 | 9/2019 | Lin et al. | |
| 2018/0052892 A1* | 2/2018 | Cho ...................... | G16H 40/63 |

(Continued)

FOREIGN PATENT DOCUMENTS

| | | |
|---|---|---|
| CN | 113342994 A | 9/2021 |
| CN | 114743029 A | 7/2022 |
| WO | 2022104293 A1 | 5/2022 |

OTHER PUBLICATIONS

Yao et al., "Filip: Fine-Grained Interactive Language-Image Pre-Training", Published as a conference paper at ICLR, total 21 pages (Jan. 29, 2022).

(Continued)

*Primary Examiner* — Khanh B Pham
(74) *Attorney, Agent, or Firm* — Leydig, Voit & Mayer, Ltd.

(57) ABSTRACT

A method is provided for data processing performed by a processing system. The method comprises determining a set of first tokens for first data and a set of second token for second data, each token comprising information associated with a segment of the respective data, determining pair-wise similarities between the set of first tokens and the set of second tokens, each pair comprising a first token in the set of first tokens and a second token in the set of second tokens, determining, for each first token in the set of first tokens, a maximum similarity based on the determined pair-wise similarities between the respective first token and the second tokens in the set of second tokens, and determining a first similarity between the first data and the second data by aggregating the maximum similarities corresponding to the first tokens in the set of first set of tokens.

20 Claims, 4 Drawing Sheets

(56) References Cited

U.S. PATENT DOCUMENTS

| | | | |
|---|---|---|---|
| 2021/0141798 A1* | 5/2021 | Steedman Henderson | ................... G06F 16/3344 |
| 2021/0294794 A1 | 9/2021 | Bordawekar et al. | |
| 2022/0179857 A1 | 6/2022 | Kompella et al. | |
| 2023/0154146 A1* | 5/2023 | Li ........................... | G06V 20/46 382/159 |
| 2023/0177810 A1* | 6/2023 | Xu ........................ | G06V 10/774 382/159 |
| 2023/0237772 A1* | 7/2023 | Li ........................ | G06V 10/803 382/176 |
| 2023/0259779 A1* | 8/2023 | Ye .......................... | G06F 16/783 |
| 2023/0325685 A1* | 10/2023 | Caba Heilbron .... | G06V 10/764 |

OTHER PUBLICATIONS

Chen et al., "Meta Module Network for Compositional Visual Reasoning," 2021 IEEE Winter Conference on Applications of Computer Vision (WACV), Waikoloa, HI, USA, total 10 pages (Jul. 3, 2021).

* cited by examiner

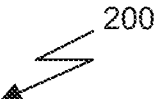

200

Determining a set of first tokens for first data and a set of second tokens for second data, each token including information associated with a segment of the respective data.
210

Determining pair-wise similarities between the set of first tokens and the set of second tokens, each pair comprising a first token in the set of first tokens and a second token in the set of second tokens.
220

Determining, for each first token in the set of first tokens, a maximum similarity based on the determined pair-wise similarities between the respective first token and all the second tokens in the set of second tokens.
230

Determining, by aggregating the maximum similarities corresponding to the first tokens in the set of first set of tokens, a similarity between the first data and the second data.
240

*Fig. 2*

SYSTEM AND METHOD FOR CROSS-MODAL INTERACTION BASED ON PRE-TRAINED MODEL

TECHNICAL FIELD

This disclosure relates generally to machine learning technologies and, more specifically, to processing data using neural network technologies.

BACKGROUND

Pre-train-and-fine-tune schemes have achieved great success in the domains of natural language processing and computer vision, which is then naturally extended to a joint cross-modal domain of Vision-and-Language Pre-training (VLP). Recently, various VLP models have been trained by using publicly available datasets with image-text pairs from Internet as pre-training datasets. It was shown that pretraining models on larger-scale datasets with more than a hundred million samples can be more powerful.

Large-scale VLP models, such as the Contrastive Language-Image Pre-training (CLIP) model, have recently demonstrated successes across various downstream tasks. The large-scale VLP models learn visual and textual representations from millions of image-text pairs collected from Internet and show superior zero-shot ability and robustness. The core technique of these large-scale VLP models lies in the global contrastive alignment of images and texts through a dual-stream model. Such dual-stream model architecture is inference-efficient for certain downstream tasks (e.g., a retrieval task), because encoders for the two modalities (i.e., images and texts) can be decoupled and the image or text representations can be pre-computed offline. However, for example, the CLIP model solely addresses the cross-modal interactions by computing similarity based on the global feature of each modality, and thus lacks the ability to capture finer information, such as the relationship between visual objects in an image and textual words in a text.

Existing technologies are mainly developed in two directions to achieve fine-grained cross-modal interactions. Along one direction, a pre-trained object detector is used to extract features in region-of-interest (ROI) from images, which are then fused with the paired text by using a VLP model. The cross-modal interactions are usually modeled via the similarity of the global feature of each modality. Along the other direction, token-wise or patch-wise representations from both modalities are enforced into the same space, thereby modeling fine-grained interactions between the representations via cross-attention or self-attention. However, the former cannot provide sufficient information, whereas the latter suffers from inferior efficiency in both training and inference.

As the foregoing illustrates, there is a need to develop a technology that provides solutions to fine-grained cross-modal interactions in machine learning tasks with improved performance.

SUMMARY

In an exemplary embodiment, the present disclosure provides a method for data processing performed by a processing system. The method comprises determining a set of first tokens for first data and a set of second token for second data, each token comprising information associated with a segment of the respective data, determining pair-wise similarities between the set of first tokens and the set of second tokens, each pair comprising a first token in the set of first tokens and a second token in the set of second tokens, determining, for each first token in the set of first tokens, a maximum similarity based on the determined pair-wise similarities between the respective first token and the second tokens in the set of second tokens, and determining a first similarity between the first data and the second data by aggregating the maximum similarities corresponding to the first tokens in the set of first set of tokens.

In a further exemplary embodiment, the processing system implements a neural network model comprising a first network and a second network. The method further comprises generating the set of first tokens for the first data based on the first network, and generating the set of second tokens for the second data based on the second network.

In a further exemplary embodiment, the neural network model comprises an adjustable embedding size. The method further comprises reducing the embedding size to 256, and computing, based on the reduced embedding size by using the first network or the second network, vectors associated with the set of respective tokens. The adjustable embedding size defines dimensions of the vectors computed by the respective network in the neural network model.

In a further exemplary embodiment, the method further comprises computing the set of first tokens or the set of second tokens using a half-precision floating point format.

In a further exemplary embodiment, the method further comprises training the neural network model on a set of training data, the training data comprising a plurality of first data and a plurality of second data, determining first similarities between first data in the plurality of first data and second data in the plurality of second data, and determining, based on the first similarities, a first contractive loss for the set of training data.

In a further exemplary embodiment, the method further comprises determining, for each second token in the set of second tokens for each second data, a maximum similarity based on pair-wise similarities between the respective second token and first tokens in a set of first tokens for corresponding first data, and determining a respective second similarity between the respective second data and the corresponding first data by aggregating the maximum similarities corresponding to the respective second tokens in the respective set of second tokens. The pair-wise similarities are associated with the respective second data and the corresponding first data.

In a further exemplary embodiment, the method further comprises determining second similarities between first data in the plurality of first data and second data in the plurality of second data, determining, based on the second similarities, a second contractive loss for the set of training data, determining an aggregated contractive loss by combining the first contractive loss and the second contractive loss by weights, and updating the neural network model based on the aggregated contractive loss.

In a further exemplary embodiment, the plurality of second data comprises a plurality of texts. The method further comprises generating, for each text, a plurality of derived texts by applying templates to the respective text, and determining, for each first data in an updated set of training data, a mean similarity associated with the respective text. The plurality of derived texts are added to the set of training data as additional second data to obtain the updated set of training data, and the derived texts are associated with the respective text. The method further comprises determining token-wise similarities between the respective first data and the plurality of derived texts associated with the respective text in the updated set of training data, determining first similarities between the respective first data and the plurality of derived texts associated with the respective text in the updated set of training data, and aggregating the first similarities between the respective first data and the plurality of derived texts associated with the respective text in the updated set of training data.

In a further exemplary embodiment, the method further comprises receiving the first data and a plurality of second data, and determining second data in the plurality of second data being relevant to the first data. The relevant second data corresponds to a first similarity of the largest value.

In another exemplary embodiment, the present disclosure provides a system for data processing. The system comprises one or more processors and a non-transitory computer-readable medium having computer-executable instructions stored thereon. The computer-executable instructions, when executed by one or more processors, causing the one or more processors to facilitate determining a set of first tokens for first data and a set of second token for second data, each token comprising information associated with a segment of the respective data, determining pair-wise similarities between the set of first tokens and the set of second tokens, each pair comprising a first token in the set of first tokens and a second token in the set of second tokens, determining, for each first token in the set of first tokens, a maximum similarity based on the determined pair-wise similarities between the respective first token and the second tokens in the set of second tokens, and determining a first similarity between the first data and the second data by aggregating the maximum similarities corresponding to the first tokens in the set of first set of tokens.

In a further exemplary embodiment, the system implements a neural network model comprising a first network and a second network. The one or more processors further facilitate generating the set of first tokens for the first data based on the first network, and generating the set of second tokens for the second data based on the second network.

In a further exemplary embodiment, the neural network model comprises an adjustable embedding size. The one or more processors further facilitate reducing the embedding size to 256, and computing, based on the reduced embedding size by using the first network or the second network, vectors associated with the set of respective tokens. The adjustable embedding size defines dimensions of the vectors computed by the respective network in the neural network model.

In a further exemplary embodiment, the one or more processors further facilitate computing the set of first tokens or the set of second tokens using a half-precision floating point format.

In a further exemplary embodiment, the one or more processors further facilitate training the neural network model on a set of training data, the training data comprising a plurality of first data and a plurality of second data, determining first similarities between first data in the plurality of first data and second data in the plurality of second data, and determining, based on the first similarities, a first contractive loss for the set of training data.

In a further exemplary embodiment, the one or more processors further facilitate determining, for each second token in the set of second tokens for each second data, a maximum similarity based on pair-wise similarities between the respective second token and first tokens in a set of first tokens for corresponding first data, and determining a respective second similarity between the respective second data and the corresponding first data by aggregating the maximum similarities corresponding to the respective second tokens in the respective set of second tokens. The pair-wise similarities are associated with the respective second data and the corresponding first data.

In a further exemplary embodiment, the one or more processors further facilitate determining second similarities between first data in the plurality of first data and second data in the plurality of second data, determining, based on the second similarities, a second contractive loss for the set of training data, determining an aggregated contractive loss by combining the first contractive loss and the second contractive loss by weights, and updating the neural network model based on the aggregated contractive loss.

In a further exemplary embodiment, the plurality of second data comprises a plurality of texts. The one or more processors further facilitate generating, for each text, a plurality of derived texts by applying templates to the respective text, and determining, for each first data in an updated set of training data, a mean similarity associated with the respective text. The plurality of derived texts are added to the set of training data as additional second data to obtain the updated set of training data, and the derived texts are associated with the respective text. The one or more processors further facilitate determining token-wise similarities between the respective first data and the plurality of derived texts associated with the respective text in the updated set of training data, determining first similarities between the respective first data and the plurality of derived texts associated with the respective text in the updated set of training data, and aggregating the first similarities between the respective first data and the plurality of derived texts associated with the respective text in the updated set of training data.

In a further exemplary embodiment, the one or more processors further facilitate receiving the first data and a plurality of second data, and determining second data in the plurality of second data being relevant to the first data. The relevant second data corresponds to a first similarity of the largest value.

In yet another exemplary embodiment, the present disclosure provides a non-transitory computer-readable medium having processor-executable instructions stored thereon for data processing. The computer-executable instructions, when executed by one or more processors, cause the one or more processors to facilitate determining a set of first tokens for first data and a set of second token for second data, each token comprising information associated with a segment of the respective data, determining pair-wise similarities between the set of first tokens and the set of second tokens, each pair comprising a first token in the set of first tokens and a second token in the set of second tokens, determining, for each first token in the set of first tokens, a maximum similarity based on the determined pair-wise similarities between the respective first token and the second tokens in the set of second tokens, and determining a first similarity between the first data and the second data by aggregating the maximum similarities corresponding to the first tokens in the set of first set of tokens.

In a further exemplary embodiment, the instructions cause the one or more processors to run a neural network model comprising a first network and a second network. The one or more processors further facilitate generating the set of first tokens for the first data based on the first network, and generating the set of second tokens for the second data based on the second network.

BRIEF DESCRIPTION OF THE DRAWINGS

The system and method for data processing are described in detail below with reference to the attached drawing figures, wherein:

FIG. 2 illustrates an exemplary process of data processing, in accordance with some embodiments.

DETAILED DESCRIPTION

Systems and methods are disclosed related to a Fine-grained Interactive Language-Image Pre-training (FILIP) technique, which provides solutions to achieve fine-grained alignment between modalities in multi-modal data by implementing a cross-modal late interaction mechanism. In some examples, the FILIP technique may use the cross-modal late interaction mechanism in contrastive learning (e.g., by computing the contrastive loss), instead of using cross or self-attention, to model the fine-grained alignment. When applying the cross-modal late interaction mechanism, the contrastive loss may be computed based on a token-wise maximum similarity between visual and textual tokens to guide the contrastive objective in the contrastive learning. In this way, the FILIP framework may exploit the fine-grained expressiveness among image patches (associated with visual tokens) and textual words (associated with textual tokens), while being able to pre-compute image and text representations offline.

Figure 1A:
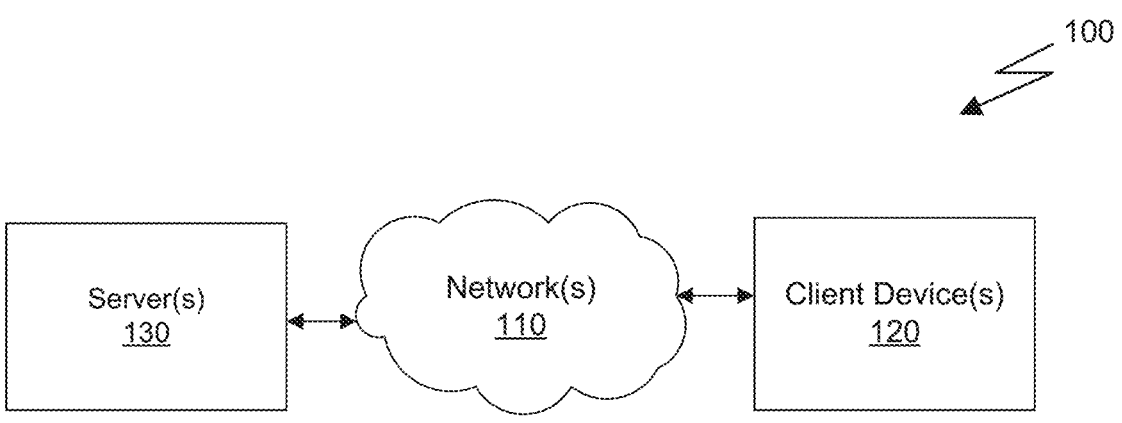
FIG. 1A illustrates an exemplary network environment, in accordance with some embodiments.

FIG. 1A illustrates an exemplary network environment 100, in accordance with one or more examples in the present disclosure. Machine learning techniques implementing the FLIP framework disclosed herein may take place in the exemplary network environment 100. Network environments suitable for use in implementing embodiments of the disclosure may include one or more client devices 120, servers 130, and/or other device types.

Components of a network environment may communicate with each other via a network(s) 110, which may be wired, wireless, or both. By way of example, network 110 may include one or more Wide Area Networks ("WANs"), one or more Local Area Networks ("LANs"), one or more public networks such as the Internet, and/or one or more private networks. Where the network includes a wireless telecommunications network, components such as a base station, a communications tower, access points, or other components may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces ("APIs")). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). A cloud-based network environment may be private (e.g., limited to a single organization), may be public (e.g., available to many organizations), and/or a combination thereof (e.g., a hybrid cloud environment).

Figure 1B:
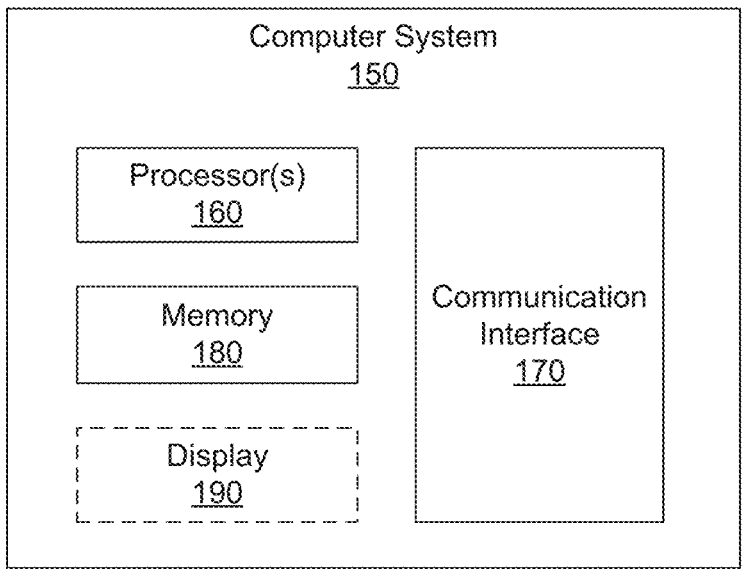
FIG. 1B illustrates an exemplary computer system, in accordance with some embodiments.

Client device(s) 120 may include at least some of the components, features, and functionality of the example computer system 150 of FIG. 1B. By way of example and not limitation, a client device 120 may be embodied as a Personal Computer ("PC"), a laptop computer, a mobile device, a smartphone, a tablet computer, a virtual reality headset, a video player, a video camera, a vehicle, a virtual machine, a drone, a robot, a handheld communications device, a vehicle computer system, an embedded system controller, a workstation, an edge device, any combination of these delineated devices, or any other suitable device.

FIG. 1B illustrates a block diagram of an exemplary computer system 150 configured to implement various functions according to one or more embodiments in the present disclosure. In some examples, computer system 150 may be implemented in a client device 120 or a server 130 in network environment 100 as shown in FIG. 1A. One or more computing systems 150, one or more client devices 120, one or more servers 130, or the combination thereof may form a processing system to perform the processes in the present disclosure.

As shown in FIG. 1B, computer system 150 may include one or more processors 160, a communication interface 170, a memory 180, and a display 190. Processor(s) 160 may be configured to perform the operations in accordance with the instructions stored in memory 180. Processor(s) 160 may include any appropriate type of general-purpose or special-purpose microprocessor (e.g., a CPU or GPU, respectively), digital signal processor, microcontroller, or the like. Memory 180 may be configured to store computer-readable instructions that, when executed by processor(s) 160, can cause processor(s) 160 to perform various operations disclosed herein. Memory 180 may be any non-transitory type of mass storage, such as volatile or non-volatile, magnetic, semiconductor-based, tape-based, optical, removable, non-removable, or other type of storage device or tangible computer-readable medium including, but not limited to, a read-only memory ("ROM"), a flash memory, a dynamic random-access memory ("RAM"), and/or a static RAM.

Communication interface 170 may be configured to communicate information between computer system 150 and other devices or systems, such as client device 120 and/or server 130 as show in FIG. 1A. For example, communication interface 170 may include an integrated services digital network ("ISDN") card, a cable modem, a satellite modem, or a modem to provide a data communication connection. As another example, communication interface 170 may include a local area network ("LAN") card to provide a data communication connection to a compatible LAN. As a further example, communication interface 170 may include a high-speed network adapter such as a fiber optic network adaptor, 10G Ethernet adaptor, or the like. Wireless links can also be implemented by communication interface 170. In such an implementation, communication interface 170 can send and receive electrical, electromagnetic or optical signals that carry digital data streams representing various types of information via a network. The network can typically include a cellular communication network, a Wireless Local Area Network ("WLAN"), a Wide Area Network ("WAN"), or the like.

Communication interface 170 may also include various I/O devices such as a keyboard, a mouse, a touchpad, a touch screen, a microphone, a camera, a biosensor, etc. A user may input data to computer system 150 (e.g., a terminal device) through communication interface 170.

Display 190 may be integrated as part of computer system 150 or may be provided as a separate device communicatively coupled to computer system 150. Display 190 may include a display device such as a Liquid Crystal Display ("LCD"), a Light Emitting Diode Display ("LED"), a plasma display, or any other type of display, and provide a Graphical User Interface ("GUI") presented on the display for user input and data depiction. In some embodiments, display 190 may be integrated as part of communication interface 170.

Multi-modal data refers to data that spans different types and contexts, such as graphics, sounds, texts, etc., which provides multi-dimensional information to assist with complementary understanding of a target object. A modality refers to the way in which a respective type of information is obtained/sensed. Cross-modal learning refers to any kind of learning that involves information obtained from more than one modality, in which information from the multiple modalities are used to enhance the learning of any of the modalities. In some examples, contrastive representation learning techniques are adopted in a cross-modal learning process. Contrastive learning is a technique that is commonly used in vision tasks, which involves comparing (e.g., contrasting) samples against each other in order to group similar samples and differentiate between different samples. The contrastive representation learning learns samples based on representations of the samples, which may be associated with features, attributes, or other suitable information of the samples.

To illustrate as an example, a general formulation of cross-modal contrastive learning is described hereinafter. In this example, the cross-modal contrastive learning is for multi-modal data, which includes image data $\mathcal{I}$ and text data $\mathcal{T}$. The object of the cross-modal contrastive learning is to correlating the image data $\mathcal{I}$ and text data $\mathcal{T}$. It will be recognized that the formulation may be extended to data of other types of modalities and to interactions/alignments between more than two modalities of the data.

The image data $\mathcal{I}$ may include a number of images, in which an image may be denoted as $x^I$. The image $x^I$ may be encoded by encoders $f_\theta$ for image data $\mathcal{I}$, such that the representations for the image $x^I$ may be obtained by $f_\theta(x^I)$. Similarly, the text data $\mathcal{T}$ may include a number of texts, each of which may be denoted as $x^T$. After encoded using encoders $g_\phi$ for the text data $\mathcal{T}$, the representations for the text $x^T$ may be obtained by $g_\phi(x^T)$. A comparison between the encoded representations $f_\theta(x^I)$ and $g_\phi(x^T)$ for the image $x^I$ and the text $x^T$ under the distance metric is expected to result in the encoded representations $f_\theta(x^I)$ and $g_\phi(x^T)$ being close if related and far apart otherwise. In this way, the images in the image data $\mathcal{I}$ and the texts in the text data $\mathcal{T}$ can be compared based on their encoded representations. As such, correlations between the images and the texts can be determined.

In a training batch (e.g., a mini-batch), a training dataset may include b number of image-text pairs, denoted as $\{x_k^I, x_k^T\}_{k=1}^b$. The most relevant image and text are arranged into an image-text pair in the training batch. A similarity score computed for an image and text in an image-text pair is expected to be higher than that of an image and text not in an image-text pair. During training, the images and the texts in the training match may be mixed and compared. In some instances, a sample pair (also referred to as a sample) including image $x_k^I$ and text $x_k^T$ in an image-text pair $\{x_k^I, x_k^T\}$, may be defined as a positive sample pair in the training batch. Otherwise, a sample pair including an image and a text not in a pre-defined image-text pair may be defined as a negative sample pair in the training batch. Then, an image-to-text contrastive loss $\mathcal{L}_k^I$ for $x_k^I$ can be formulated as, $$\mathcal{L}_k^I\left(x_k^I, \{x_j^T\}_{j=1}^b\right) = -\frac{1}{b}\log\frac{\exp(s_{k,k}^I)}{\sum_j \exp(s_{k,j}^I)}, \tag{Eq. 1}$$

where $s_{k,j}^I$ denotes the similarity of the $k^{th}$ image to the $j^{th}$ text, and $s_{k,k}^I$ denotes the similarity of the $k^{th}$ image to the $k^{th}$ text (i.e., in the $k^{th}$ image-text pair). The higher the similarity scores is for $s_{k,k}^I$ and the lower the similarity scores are for $s_{k,j}^I$, the resulting image-to-text contrastive loss $\mathcal{L}_k^I$ becomes smaller (i.e., approaching zero). Similarly, the text-to-image contrastive loss $\mathcal{L}_k^T$ for $x_k^T$ is formulated as, $$\mathcal{L}_k^T\left(x_k^T, \{x_j^I\}_{j=1}^b\right) = -\frac{1}{b}\log\frac{\exp(s_{k,k}^T)}{\sum_j \exp(s_{k,j}^T)}. \tag{Eq. 2}$$

When one or more models are trained to learn both the image-to-text contrastive loss $\mathcal{L}_k^I$ and the text-to-image contrastive loss $\mathcal{L}_k^T$, for example, via dual-stream models, the total loss for a mini-batch with b number of image-text pairs can be computed by, $$\mathcal{L} = \frac{1}{2}\sum_{k=1}^b \left(\mathcal{L}_k^I + \mathcal{L}_k^T\right). \tag{Eq. 3}$$

It will be recognized that other weights may be applied to aggregate the contrastive losses computed by the model(s) subject to different applications. In this example, a dual-stream model is trained to learn image-to-text contrastive losses and text-to-image contrastive losses in parallel.

As demonstrated in Equations 1 and 2, the cross-modal interaction may be reflected in computations of the similarities $s_{i,j}^I$ and $s_{j,i}^T$ between the $i^{th}$ image and $j^{th}$ text.

Existing methods, such as CLIP (short for "Contrastive Language-Image Pretraining"), simply encode each image or text separately to a global feature i.e., $f_\theta(x_i^I)$ or $g_\phi(x_j^T)$, and then compute these two similarities as, $$s_{i,j}^I = s_{j,i}^T = f_\theta(x_i^I)^T g_\phi(x_j^T). \qquad \text{(Eq. 4)}$$

However, fine-grained interactions are neglected between the two modalities, by applying Equation 4. For example, when each image includes multiple patches and each text includes multiple words, word-patch alignments are not embedded in Equation 4. The following describes implementation of the FLIP technique, which is designed to enhance the fine-grained interactions by applying a token-wise cross-modal late interaction. Under late interaction, two pieces of data, such as an image $x_i^I$ and a text $x_j^T$, are separately encoded into two sets of informational embeddings (e.g., the respective representations/tokens), and relevance between the two pieces of data is evaluated based on computations between the two sets of informational embeddings.

In a framework implemented with the FLIP technique, the $i^{th}$ image and $j^{th}$ text are further represented by a number of tokens. Non-padded tokens are adopted as an example, of which the lengths are not modified by adding special padding tokens, as opposed to padded tokens. The (non-padded) tokens (e.g., visual tokens) associated with the $i^{th}$ image are numbered between one and an integer $n_1$, where each visual token may be associated with an image patch. Each image patch includes a subset of pixels in the $i^{th}$ image. The (non-padded) tokens (e.g., textual tokens) associated with the $j^{th}$ text may be numbered between zero and an integer $n_2$, where each textual token may be associated with a word. Each word includes a subset of letters/symbols in the $j^{th}$ text. The corresponding encoded features $[f_\theta(x_i^I)]_k$ and $[g_\phi(x_j^T)]_r$ are associated with the $k^{th}$ token of the $i^{th}$ image and the $r^{th}$ token of the $j^{th}$ text, respectively.

For the $k^{th}$ visual token, similarities are computed against all textual tokens in the text $x_j^T$. Then, the largest similarity is used to compute the token-wise maximum similarity corresponding to the $k^{th}$ visual token with respect to $x_j^T$, by applying $$\max_{1 \le r < n_2} [f_\theta(x_i^I)]_k^T [g_\phi(x_j^T)]_r, \qquad \text{(Eq. 5)}$$

where the max( ) is an operation that selects the maximum value of $[f_\theta(x_i^I)]_k^T [g_\phi(x_j^T)]_r$ among the $n_2$ number of textual tokens. The results computed by applying Equation 5 to all the visual tokens are aggregated to obtain the similarity of the image $x_i^I$ to the text $x_j^T$. In some variations, the image-to-text similarity may be computed by taking an average over the maximum similarities corresponding to all the visual tokens in the respective image, which may be formulated by $$s_{i,j}^I(x_i^I, x_j^T) = \frac{1}{n_1} \sum_{k=1}^{n_1} [f_\theta(x_i^I)]_k^T [g_\phi(x_j^T)]_{m_k^I}, \qquad \text{(Eq. 6a)}$$

$$\text{where } m_k^I = \arg\max_{1 \le r < n_2} [f_\theta(x_i^I)]_k^T [g_\phi(x_j^T)]_r. \qquad \text{(Eq. 6b)}$$

Intuitively, according to Equations 6a and 6b, the token-wise maximum similarity is related to the most relevant word for each image patch. Similarly, the similarity of the $j^{th}$ text to the $i^{th}$ image can be computed by, $$s_{j,i}^T(x_j^T, x_i^I) = \frac{1}{n_2} \sum_{r=1}^{n_2} [f_\theta(x_i^I)]_{m_r^T}^T [g_\phi(x_j^T)]_r, \qquad \text{(Eq. 7a)}$$

$$\text{where } m_k^T = \arg\max_{1 \le r < n_1} [f_\theta(x_i^I)]_k^T [g_\phi(x_j^T)]_r. \qquad \text{(Eq. 7b)}$$

According to Equations 7a and 7b, the token-wise maximum similarity is related to the most relevant image patch for each word.

As the foregoing illustrates, the similarity calculated by implementing the FLIP technique (e.g., using Equations 6a, 6b, 7a, and 7b) takes into account fine-grained interactions between images and text, by enabling token comparisons based on the most relevant image patch-word pairs. To this end, the FLIP technique allows to compute the contrastive losses in a more precise way by substituting these similarities into Equations 1, 2, and/or 3 instead of using global features, thereby significantly improving the performance of the dual-stream model learning between images and text in various tasks, for example, by performing fine-grained alignments between image patches and words. It will be recognized that the FLIP technique in the present disclosure can be extended to other types of multi-modal data and applied to any suitable models (e.g., multiple single-stream models or multi-stream models).

FIG. 2 is an exemplary process 200 of data processing, in accordance with one or more examples of the present disclosure. Process 200 may be performed by a processing system including one or more computer systems 150 as illustrated in FIG. 1B, which may be embodied as one or more client devices 120, one or more servers 130, or a combination thereof in network environment 100 as depicted in FIG. 1A. Process 200 may be performed alone or in combination with other processes in the present disclosure. It will be recognized that process 200 may be performed in any suitable environment and in any suitable order.

In the exemplary process as demonstrated in FIG. 2, the processing system may be implemented with a dual-stream model, which may take data associated with two modalities as input. For instance, the data may include first data associated with a first modality and second data associated with a second modality. Examples of the first/second data include but not limited to an image, a text, an audio, etc. Process 200 may be applied in both training and inference phases. During the training, the correlation between the first data and the second data may be predefined, such that the dual-stream model may learn to predict the similarity between the first and second data and to update the model by minimizing the difference between the prediction and the predefined correlation. During the inference, the dual-stream model may perform various types of tasks. In one example, the dual-stream model may receive a text and determine the most relevant image from an image database. In another example, the dual-stream model may receive multiple texts and multiple images and determine correlations (e.g., relevance) among the multiple texts and images.

At step 210, the processing system determines a set of first tokens for first data and a set of second tokens for second data. Information included in the first/second data, such as features, attributes, semantics, etc., may be represented by a plurality of tokens. Each token may be associated with information related to a segment of the first/second data. Various methods may be applied to generate tokens, some of which may depend on data type. It should be noted that examples provided in the present disclosure are for illustrative purposes only, and other suitable methods may be used to generate tokens.

Figure 3:
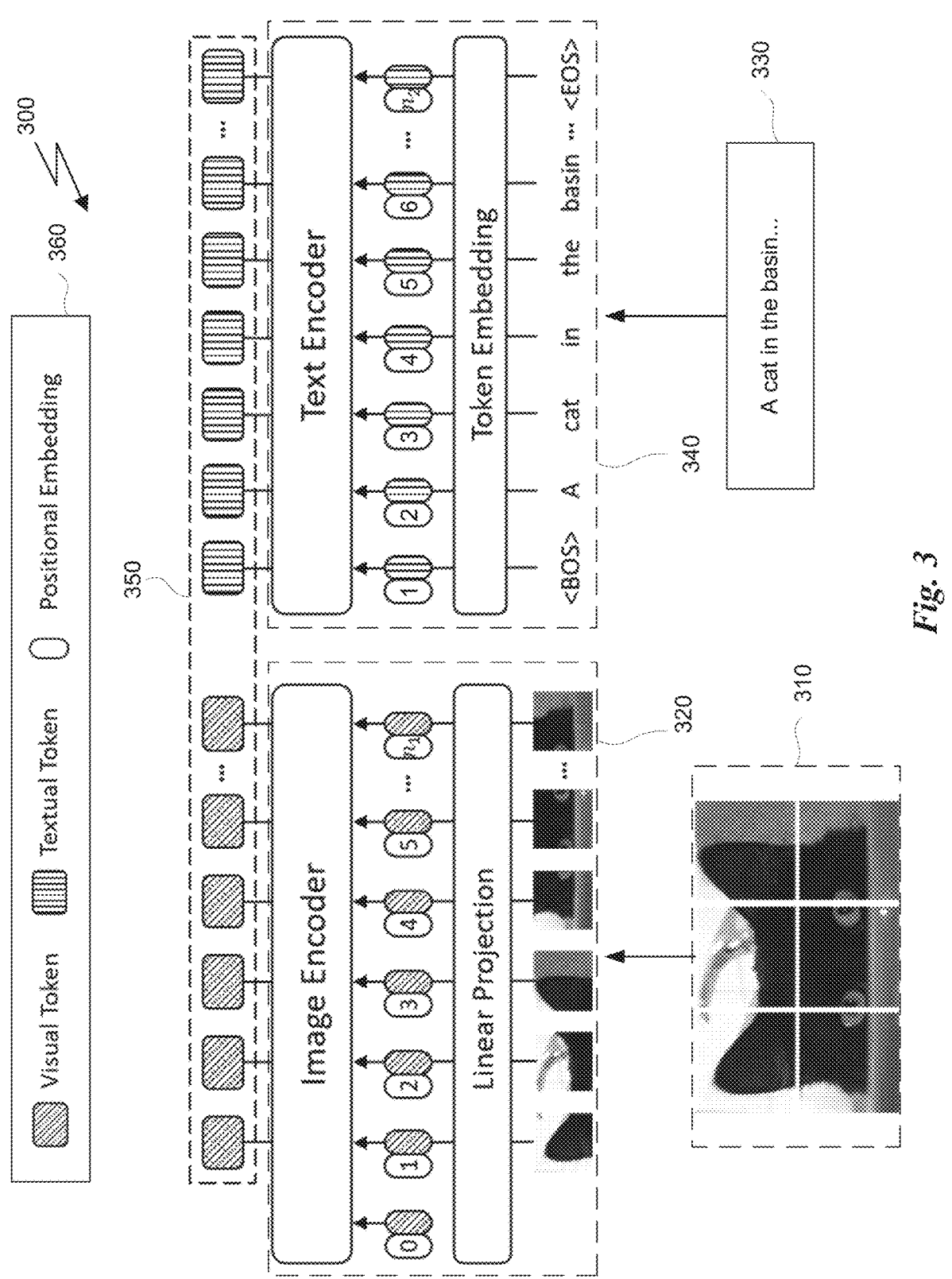
FIG. 3 demonstrates an exemplary process of generating tokens, in accordance with some embodiments.

FIG. 3 demonstrates an exemplary process 300 of generating tokens. Process 300 may be performed by the processing system, which may be implemented with neural networks to generate representations (e.g., tokens) of input data. In some examples, the neural networks may include several convolutional, pooling and/or fully connected layers for exploiting features/attributes from the input data. To this end, the generated tokens may represent extracted features/attributes, which may be encoded by using encoders.

As demonstrated in FIG. 3, first data includes an image as shown in block 310, and second data includes a text as shown in block 330. The text may include a number of words, an indication "BOS" for the begin of a sentence, and an indication "EOS" for the end of the sentence. Each of the image and the text may be divided into segmentations. The segmentations may be of the same or different sizes. For instance, the image in block 310 may be divided into image patches with predefined width and height (in pixels). The text in block 320 may be divided into semantic units (e.g., words) with arbitrary number of letters/symbols.

The processing system may take the image patches as input to a first neural network as shown in block 320, and may take the semantic units as input to a second neural network as shown in block 340. The legend 360 demonstrates visual tokens, textual tokens, and positional embedding being represented by various shapes with different patterns.

The first neural network takes the image patches as input. The first neural network may include a linear projection layer, which "projects" a representation of dimensionality M into a representation space of dimensionality N. By passing the images patches through the linear projection layer, the first neural network may obtain $n_1+1$ number of vectors based on the image patches and associate the vectors with positional embeddings. One of the vectors (e.g., the first vector with notation "0") may be defined as a class embedding that is associated with the respective input image. The first neural network may further include an image encoder layer, which may encode the $n_1+1$ number of vectors with the positional embeddings to obtain n 1 number of visual tokens. For example, the first neural network may first generate $n_1+1$ number of visual tokens based on the $n_1+1$ number of vectors and then may use n 1 number of visual tokens in other steps in process 200. Some or all of the processes performed by the first neural network may be described by $[f_\theta(x_i^I)]_k$ as discussed above.

The second neural network takes the semantic units as input. The second neural network may include a token embedding layer, which may convert each semantic unit into a vector representation with a predefined dimension (e.g., an embedding size). By passing the semantic units through the token embedding layer, the second neural network may obtain $n_2$ number of vectors based on the semantic units and associate the vectors with positional embeddings. The second neural network may further include a text encoder layer, which may encode the $n_2$ number of vectors with the positional embeddings to generate $n_2$ number of textual tokens. Some or all of the processes performed by the second neural network may be described by $[g_\phi(x_j^T)]_r$ as discussed above.

At step 220, the processing system determines pair-wise similarities between the set of first tokens and the set of second tokens. Each pair of tokens include a first token in the first set of tokens and a second token in the second set of tokens. The first set of tokens and the second set of tokens may be arranged to indicate rows and columns in a two-dimensional matrix. The pair-wise similarities may form elements in the matrix.

At step 230, the processing system determines, for each first token in the set of first tokens, a maximum similarity based on the determined pair-wise similarities between the respective first token and all the second tokens in the set of second tokens. For instance, an equation similar to Equation 5 may be applied to determine a second token in the second set of tokens, which is the most relevant to the first token, for example with the highest similarity score.

At step 240, the processing system determines a similarity between the first data and the second data by aggregating the maximum similarities corresponding to the first tokens in the set of first tokens. For instance, equations similar to Equations 6a, 6b, 7a, and 7b may be applied to determine the similarity between the first data and the second data.

In some variations, the processing system may perform steps 220-240 in a number of instances concurrently. For example, the processing system may calculate image-to-text similarities by applying Equations 6a and 6b in one instance, and may calculate text-to-image similarities by applying Equations 7a and 7b in another instance.

Figure 4:
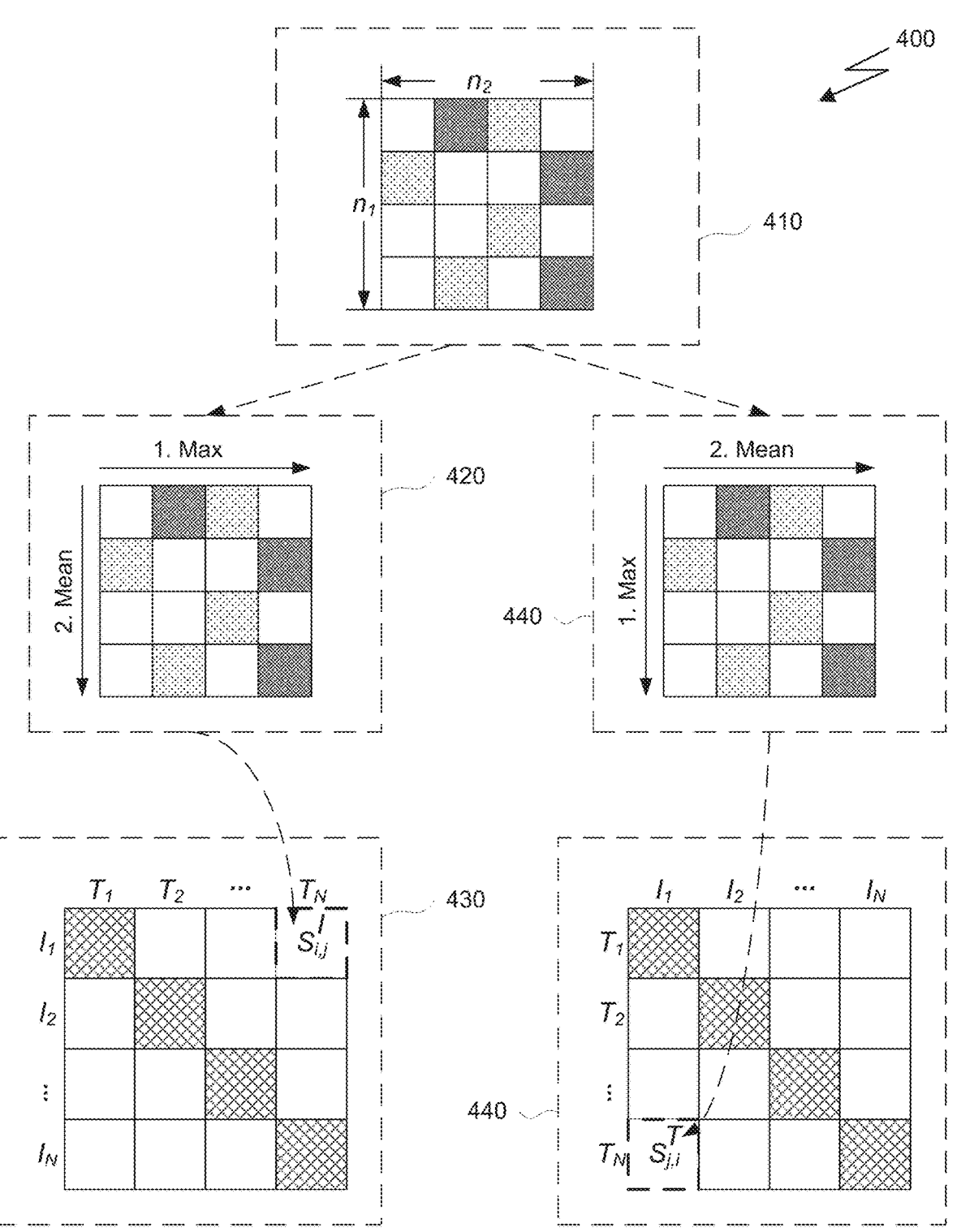
FIG. 4 demonstrates an exemplary process for determining similarities by implementing steps 220-240 of the exemplary process as shown in FIG. 3, in accordance with some embodiments.

FIG. 4 demonstrates an exemplary process 400 for determining similarities by implementing steps 220-240 of process 200 as shown in FIG. 3. Process 400 may take the visual tokens generated in FIG. 3 as the first set of tokens and take the textual tokens generated in FIG. 3 as the second set of tokens. The processing system may perform step 220 of process 200 to determine pair-wise similarities between the visual tokens and the textual tokens. As shown in block 410, the pair-wise similarities may form a two-dimensional matrix. In this example, the rows of the matrix may be associated with the $n_1$ number of visual tokens, and the columns of the matrix may be associated with the $n_2$ number of textual tokens.

Blocks 420 and 430 may be related to one instance performed by the processing system to calculate image-to-text similarities. As shown in block 420, the processing system may first perform step 230 of process 200 to find the maximum similarity in each row by applying Equation 6b. Then, the processing system may perform step 240 of process 200 to obtain the image-to-text similarity, which is the average of the maximum similarities of all rows according to Equation 6a. As shown in block 430, the processing system may process a batch of N images (referred to as "$I_1, \ldots, I_N$") and N texts (referred to as "$T_1, \ldots, T_N$") in one instance. Computation of one matrix as shown in block 410/420 results in one pair-wise similarity $S_{i,j}^I$ in the matrix in block 430. The processing system may repeat steps 210-240 of process 200 to compute all the pair-wise similarities in the matrix in block 430.

Blocks 440 and 450 may be related to another instance performed by the processing system to calculate text-to-image similarities. As shown in block 440, the processing system may first perform step 230 of process 200 to find the maximum similarity in each column by applying Equation 7b. Then, the processing system may perform step 240 of process 200 to obtain the text-to-image similarity, which is the average of the maximum similarities of all columns according to Equation 7a. As shown in block 450, the batch of N images (referred to as "$I_1, \ldots, I_N$") and N texts (referred to as "$T_1, \ldots, T_N$") may form a matrix that is the transpose of the matrix in block 430. Similarly, computation of one matrix as shown in block 410/440 results in one pair-wise similarity $S_{j,i}^T$ in the matrix in block 450. The processing system may repeat steps 210-240 of process 200 to compute all the pair-wise similarities in the matrix in block 450.

In some examples, the batch of N images and N texts may be included in a batch of training dataset, with N number of predefined image-text pairs. In the example shown in FIG. 4, the images and the texts may be arranged in such a way that in block 430/450, the predefined image-text pairs are associated with diagonal elements in the matrix.

In some instances, the processing system may employ additional implementations to improve the performance of model training/inference depending on various practical applications. For example, when the model is run on a processing system with limited computational power (e.g., with limited communication/memory bandwidth, with limited number of computing cores, etc.), the processing system may perform the above-described computation of token-wise representations for both modalities inefficiently, especially when a batch size is large.

In one example, an embedding size in the model may be adjusted. Embedding is a technique for mapping discrete categorical variables to high-dimensional vectors, such that the high-dimensional vectors can be translated into relatively low-dimensional space. Embedding can benefit machine learning on tasks with large inputs, such as sparse vectors representing words. The embedding size defines the dimension/length of the vectors. The processing system may reduce the embedding size to 256 or other suitable numbers to reduce the computational complexity.

In another example, when the processing system computes features, vectors, and/or tokens in step 210 of process 200 as shown in FIG. 2 or process 300 as shown in FIG. 3, the processing system may adopt a reduced precision in computations. For example, the precision of the last-layer features of both modalities may be reduced from FP32 to FP16 before node communication in a distributed learning setting, and perform the multiplication under the reduced precision. Half-precision floating point format ("FP16") is a computer number format, which uses 16 bits in computer memory, while single-precision floating-point format ("FP32") uses 32 bits. Lowering the required memory enables training of larger models or training with larger mini-batches, as well as shortens the training or inference time.

In still another example, the processing system may run one or more models on a plurality of processors utilizing parallel processing units (e.g., GPUs). Each processor may be referred to as a local worker. As an example, a batch of data includes 16 images and 16 texts. Each of the local workers may process four images and four texts as a subset of the data batch. First, each local worker may obtain embeddings associated with first/second tokens for each image/text, which may be used for computing token-wise similarities. Then, each local worker may compute token-wise similarities between the images and texts in the subset of the data batch so as to obtain similarities between the images and texts in the subset. In order to correlate images and texts in the entire data batch, the processing system may communication between the local worker to collect computation results. The computation results may include but not limited to similarities between images and texts on each local worker and/or embeddings associated with first/second tokens for the respective images/texts stored on each local worker. In a further example, each local worker may determine a portion (e.g., 25%) of local data to be communicated. For instance, out of the four images and four texts in a respective subset of the data batch, each local worker may determine an image and a text with the highest similarity for communication. Each local worker may be configured to sort the images and/or texts in the respective subset by computed similarities and select one or more samples (e.g., each sample including an image and a text) according to the ranking of the similarity scores. In this way, less communication bandwidth is required among the local workers. Furthermore, the processing system may construct an approximate matrix similar to the matrix in block 430/440 shown in FIG. 4 based on the collected computing results from the local workers. As shown in FIG. 4, the matrix in block 430/440 is constructed based on all the images and texts in a batch, which results in a 16×16 matrix for the exemplary batch including 16 images and 16 texts. Opposing to that, the approximate matrix may be constructed based on a subset of images and texts provided by the local workers. When each of the four local workers provides one image and one text, the resulting approximate matrix may be constructed as a 4×4 matrix. The processing system may calculate the contrastive loss according to Equation 1 or 2 based on the approximation matrix. As such, the computational cost in the processing system may be reduced.

In some instances, the processing system may use publicly available datasets from Internet. For example, Flickr30K, MSCOCO, ImageNet, and other datasets include image-text pairs, which are suitable for training of a dual-stream model by performing processes 200, 300, and 400 as shown in FIGS. 2, 3, and 4. However, models pre-trained using the publicly available dataset usually have issues of polysemy and inconsistency. To address the issues in the pre-trained models, the processing system may implement a technique, referred to as prompt templates, to augment text samples in a dataset for certain downstream tasks. A prompt provides a guideline for modifying an object (e.g., a text sample), and a prompt template provides a form, mold, or pattern used as the guide for making certain modifications.

The technique of prompt templates may be used to create derived texts based on predefined templates so as to increase the size and variety of a training dataset. In some variations, multiple prompts may be applied to a text to generate multiple derived texts, where each derived text may be associated with one prompt template. The processing system generates different token-wise representations for the derived texts. The token-wise representations associated with different prompt templates cannot be summed together to form a mean textual representation. Thus, the different prompt templates may be ensembled based on a mean token-wise similarity instead of the mean textual representation.

In some examples, C number of prompt templates may be applied to texts in a training dataset. For instance, an original text may be augmented to C different texts $x_1^T, x_2^T, \ldots, x_C^T$. The similarity between an image $x^I$ and the texts associated with the original text, referred to as a mean similarity associated with the original text, may be computed as, $$\frac{1}{C} \sum_{c=1}^{C} s_{..}^{I}(x^I, x_C^T), \tag{Eq. 8}$$

where $s_{..}^I$ is defined in Equation 6a. Various techniques can be used for constructing prompt templates. For example, a unified rule-based method can be used for image classification tasks. In image classification tasks, texts may be embodied as labels. The unified rule-based method may define each template as consisting of the following four components:

[prefix] {label}, [category description]. [suffix] (Eq. 9)

where "[prefix]" is an in-context description (e.g., "a photo of a"), "{label}" is a class label of a dataset, "[category description]" describes the category used for fine-grained image classification datasets (e.g., "a type of pet" for a publicly available dataset named "Oxford-IIIT Pets"). In some instances, the templates include adding a suffix that includes the reference word "it" (e.g., "I like it.") at the end of the prompt. Experiment results show empirical improvements of the trained model in zero-shot classification performance, probably because the reference word "it" enhances fine-grained cross-modal alignment, as the reference word "it" can also be aligned to image patches of the target object.

Additional details and advantages relating to exemplary embodiments of the present disclosure are discussed in Yao, L., Huang, R., Hou, L., Lu, G., Niu, M., Xu, H., Liang, X., Li, Z., Jiang, X., & Xu, C. (2021), "FILIP: Fine-grained Interactive Language-Image Pre-Training," (available at arxiv.org/abs/2111.07783v1), which is incorporated by reference in its entirety herein.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods/processes described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A method for processing multi-modal data, comprising:

obtaining, by a processing system, an image comprising the multi-modal data, wherein the multi-modal data comprises image data and text data, wherein the processing system implements a neural network model comprising a first neural network and a second neural network;

dividing, by the processing system, the image into a plurality of image blocks, wherein each image block has a predefined width and height;

dividing, by the processing system, a first respective image block of the plurality of image blocks into a plurality of image patches;

dividing, by the processing system, text from a second respective image block of the image blocks into a plurality of semantic units;

generating, by the processing system, using the first neural network, a set of visual tokens for image data of the first respective image block based on the plurality of image patches;

generating, by the processing system, using the second neural network, a set of textual tokens for text data of the second respective image block based on the plurality of semantic units;

determining, by the processing system, pair-wise similarities between the set of visual tokens and the set of textual tokens, each pair comprising a visual token from the set of visual tokens and a textual token from the set of second textual tokens;

determining, by the processing system, for each visual token in the set of visual tokens, a maximum similarity based on the determined pair-wise similarities between the respective visual token and the textual tokens in the set of textual tokens; and determining, by the processing system, a first similarity between the image data and the text data by aggregating the maximum similarities corresponding to the visual tokens in the set of visual tokens.

2. The method according to claim 1, wherein the neural network model comprises an adjustable embedding size, and wherein the method further comprises:

reducing the adjustable embedding size to 256;

wherein the adjustable embedding size defines dimensions of vectors obtained by the first and second neural networks in the neural network model.

3. The method according to claim 1, wherein the set of visual tokens or the set of textual tokens is obtained using a half-precision floating point format.

4. The method according to claim 1, further comprising:

training the neural network model on a set of training data, the training data comprising training image data and training text data;

determining, by the processing system, first similarities between image data in the training image data and text data in the training text data; and determining, by the processing system based on the first similarities, a first contractive loss for the set of training data.

5. The method according to claim 4, further comprising:

determining, by the processing system, for each textual token in a respective set of textual tokens, a maximum similarity based on pair-wise similarities between the respective textual token and respective visual tokens in a respective set of visual tokens; and determining, by the processing system, a second similarity between respective text data corresponding to the respective set of textual tokens and respective image data corresponding to the respective set of visual tokens by aggregating the maximum similarities corresponding to the respective textual tokens in the respective set of textual tokens.

6. The method according to claim 5, further comprising:

determining, by the processing system, second similarities between respective image data in the training image data and respective text data in the training text data;

determining, by the processing system, based on the second similarities, a second contractive loss for the set of training data;

determining, by the processing system, an aggregated contractive loss by combining the first contractive loss and the second contractive loss by weights; and updating the neural network model based on the aggregated contractive loss.

7. The method according to claim 6, further comprising:

generating, by the processing system, a plurality of derived texts by applying templates to respective text of the training text data, wherein the plurality of derived texts are added to the set of training data as additional training text data to obtain an updated set of training data, and the derived texts are associated with the respective text; and determining, by the processing system, for image data in the updated set of training data, a mean similarity associated with respective text.

8. The method according to claim 7, wherein determining the mean similarity further comprises:

determining, by the processing system, token-wise similarities between respective image data and the plurality of derived texts;

determining, by the processing system, first similarities between the respective image data and the plurality of derived texts; and aggregating, by the processing system, the first similarities between the respective image data and the plurality of derived texts.

9. The method according to claim 1, wherein generating the set of visual tokens for the image data comprises:

passing image patches of the image data through a linear projection layer of the first neural network to obtain a first number of vectors based on the image patches and associate the first number of vectors with positional embeddings; and encoding, by an image encoder layer of the first neural network, the first number of vectors with the positional embeddings to obtain the set of visual tokens.

10. The method according to claim 9, wherein the first number of vectors includes a first vector defined as a class embedding that is associated with a respective input image.

11. The method according to claim 1, wherein generating the set of textual tokens for the text data comprises:

converting, by a token embedding layer of the second neural network, semantic units of the text data into a vector representation with a predefined dimension to obtain a second number of vectors based on the semantic units and associate the second number of vectors with positional embeddings; and encoding, by a text encoder layer of the second neural network, the second number of vectors with the positional embeddings to obtain the set of textual tokens.

12. A system for processing multi-modal data, comprising:

one or more processors; and one or more memories having processor-executable instructions stored thereon;

wherein the one or more processors are configured to execute the processor-executable instructions to cause the system to perform the following:

obtaining an image comprising the multi-modal data, wherein the multi-modal data comprises image data and text data, wherein the system implements a neural network model comprising a first neural network and a second neural network;

dividing the image into a plurality of image blocks, wherein each image block has a predefined width and height;

dividing a first respective image block of the plurality of image blocks into a plurality of image patches;

dividing text from a second respective image block of the image blocks into a plurality of semantic units;

generating, using the first neural network, a set of visual tokens for image data of the first respective image block based on the plurality of image patches;

generating, using the second neural network, a set of textual tokens for text data of the second respective image block based on the plurality of semantic units;

determining pair-wise similarities between the set of visual tokens and the set of textual tokens, each pair comprising a visual token from the set of visual tokens and a textual token from the set of second textual tokens;

determining, for each visual token in the set of visual tokens, a maximum similarity based on the determined pair-wise similarities between the respective visual token and the textual tokens in the set of textual tokens; and determining a first similarity between the image data and the text data by aggregating the maximum similarities corresponding to the visual tokens in the set of visual tokens.

13. The system according to claim 12, wherein the neural network model comprises an adjustable embedding size, and wherein the one or more processors are further configured to execute the processor-executable instructions to cause the system to perform the following:

reducing the adjustable embedding size to 256;

wherein the adjustable embedding size defines dimensions of vectors obtained by the first and second neural networks in the neural network model.

14. The system according to claim 12, wherein the set of visual tokens or the set of textual tokens is obtained using a half-precision floating point format.

15. The system according to claim 12, wherein the one or more processors are further configured to execute the processor-executable instructions to cause the system to perform the following:

training the neural network model on a set of training data, the training data comprising training image data and training text data;

determining first similarities between image data in the training image data and text data in the training text data; and determining, based on the first similarities, a first contractive loss for the set of training data.

16. The system according to claim 15, wherein the one or more processors are further configured to execute the processor-executable instructions to cause the system to perform the following:

determining for each textual token in a respective set of textual tokens, a maximum similarity based on pair-wise similarities between the respective textual token and respective visual tokens in a respective set of visual tokens; and determining a second similarity between respective text data corresponding to the respective set of textual tokens and respective image data corresponding to the respective set of visual tokens by aggregating the maximum similarities corresponding to the respective textual tokens in the respective set of textual tokens.

17. The system according to claim 12, wherein generating the set of visual tokens for the image data comprises:

passing image patches of the image data through a linear projection layer of the first neural network to obtain a first number of vectors based on the image patches and associate the first number of vectors with positional embeddings; and encoding, by an image encoder layer of the first neural network, the first number of vectors with the positional embeddings to obtain the set of visual tokens.

18. One or more non-transitory computer-readable mediums having processor-executable instructions stored thereon for processing multi-modal data, wherein the processor-executable instructions, when executed, facilitate performance of the following by a processing system:

obtaining an image comprising the multi-modal data, wherein the multi-modal data comprises image data and text data, wherein the processing system implements a neural network model comprising a first neural network and a second neural network;

dividing the image into a plurality of image blocks, wherein each image block has a predefined width and height;

dividing a first respective image block of the plurality of image blocks into a plurality of image patches;

dividing text from a second respective image block of the image blocks into a plurality of semantic units;

generating, using the first neural network, a set of visual tokens for image data of the first respective image block based on the plurality of image patches;

generating, using the second neural network, a set of textual tokens for text data of the second respective image block based on the plurality of semantic units;

determining pair-wise similarities between the set of visual tokens and the set of textual tokens, each pair comprising a visual token from the set of visual tokens and a textual token from the set of second textual tokens;

determining, for each visual token in the set of visual tokens, a maximum similarity based on the determined pair-wise similarities between the respective visual token and the textual tokens in the set of textual tokens; and determining a first similarity between the image data and the text data by aggregating the maximum similarities corresponding to the visual tokens in the set of visual tokens.

19. The one or more non-transitory computer-readable mediums according to claim 18, wherein the neural network model comprises an adjustable embedding size, and wherein the processor-executable instructions, when executed, further facilitate performance of the following by the processing system:

reducing the adjustable embedding size to 256;

wherein the adjustable embedding size defines dimensions of vectors obtained by the first and second neural networks in the neural network model.

20. The one or more non-transitory computer-readable mediums according to claim 18, wherein the set of visual tokens or the set of textual tokens is obtained using a half-precision floating point format.

* * * * *